Nov. 2, 1954   F. H. McCORMICK   2,693,523
DOMESTIC APPLIANCE

Filed July 18, 1951   2 Sheets-Sheet 1

INVENTOR.
FRANCIS H. McCORMICK.
BY
Willits, Hardman & Fehr.

Nov. 2, 1954
F. H. McCORMICK
2,693,523
DOMESTIC APPLIANCE
Filed July 18, 1951
2 Sheets—Sheet 2
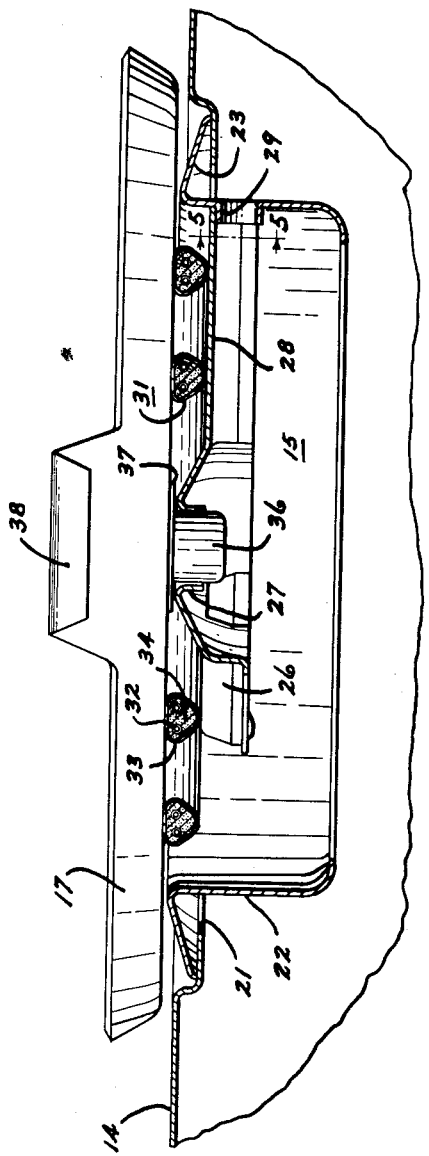
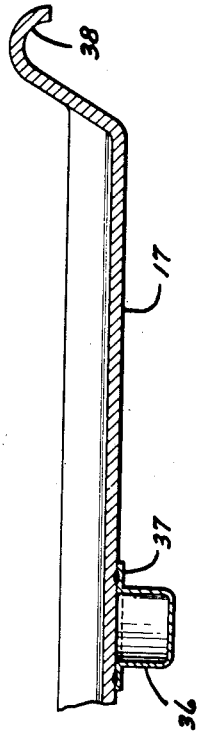
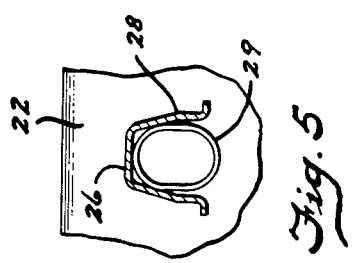
INVENTOR.
FRANCIS H. McCORMICK.
BY
Willits, Hardman & Fahs.

ial Np. 237,414

United States Patent Office 2,693,523
Patented Nov. 2, 1954

2,693,523

DOMESTIC APPLIANCE

Francis H. McCormick, Oakwood, Ohio, assignor to General Motors Corporation, Dayton, Ohio, a corporation of Delaware Application July 18, 1951, Serial No. 237,414

2 Claims. (Cl. 219—37)

My invention relates to ranges and particularly to an improvement in the use of cooking utensils in conjunction with surface heater units of electric ranges.

In ranges provided with a cooking top having openings therein and heater units associated with the openings including an electric heating element, adapted to support and heat a utensil or receptacle by contact therewith, the supporting portion of the heating element is usually slightly elevated above the porcelain enameled finish on the range top wall. Such elevation of the heating element of range surface heater units is ordinarily acceptable and satisfactory when utensils or receptacles placed on the heating element contain an amount or quantity of substance to be cooked that is of sufficient weight to permit occasional stirring or mixing of the contents of the receptacle without likelihood of its sliding or skidding off the heating unit. However, when a receptacle such as a skillet or griddle employed to fry potatoes, eggs, pancakes, sausages, hamburgers or the like, is placed on such elevated heater units, difficulty is experienced in the cooking of such items. The frying of potatoes, eggs, pancakes, sausages, or hamburgers requires these items to be frequently shifted, pressed, raised and/or turned over in the skillet or griddle, to prevent sticking thereof thereto, at which times the skillet or griddle is difficult to hold and tends to skid or slide off the heating unit. In view of the necessity of frequently shifting, raising, pressing, and/or turning over such items while cooking the same in a griddle, I contemplate the provision of means for preventing the griddle from skidding or sliding off an electric heating unit upon which the griddle is supported and heated by contact therewith.

An object of my invention is to provide a griddle or the like cooking utensil or receptacle adapted to be placed or mounted upon an electric heating element of a heater unit with means receivable by a part of the unit for preventing the griddle or receptacle from sliding off the unit.

Another object of my invention is to provide a griddle or the like cooking receptacle adapted to be placed or mounted upon an electric heating element of a surface heater unit with a stud depending from its bottom and projecting into a part of the unit whereby the griddle or receptacle may be rotated relative to the unit while resting on the heating element thereof and which stud prevents sliding of the griddle or receptacle off the heating element during its rotation.

A further and more specific object of my invention is to provide a member for holding an electric heating element of the metallic sheathed type in a utensil supporting position at the top of a range with an opening centrally thereof for receiving a portion depending from a griddle to rotatably anchor the griddle to the unit whereby the griddle will be prevented from skidding or sliding laterally from the unit particularly during rotation of the griddle on the unit.

Further objects and advantages of the present invention will be apparent from the following description, reference being had to the accompanying drawings, wherein a preferred form of the present invention is clearly shown.

In the drawings:

Fig. 2 is an enlarged fragmentary vertical sectional view of a portion of the range taken on the line 2—2 of Fig. 1 showing a griddle mounted upon an electric heating element of a surface heater unit;

Fig. 4 is a vertical sectional view taken on the line 4—4 of Fig. 3 of a portion of the griddle showing a stud secured to and depending from the bottom wall thereof; and Fig. 5 is an enlarged fragmentary vertical sectional view taken on the line 5—5 of Fig. 2 showing the mounting of the heating element holding spider upon the range.

Figure 3:
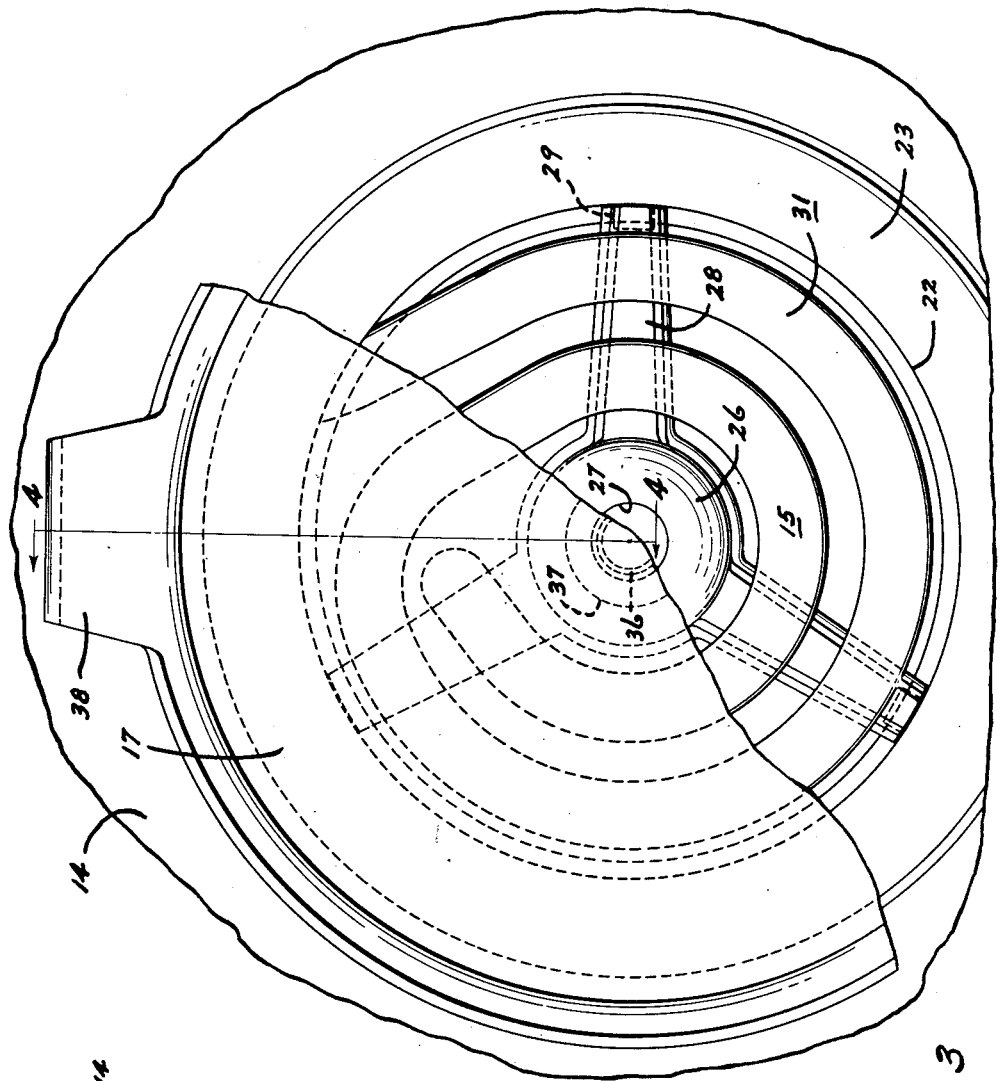
Fig. 3 is a fragmentary plan view of the heater unit shown in Fig. 2 with a portion of the griddle broken away.
Figure 1:
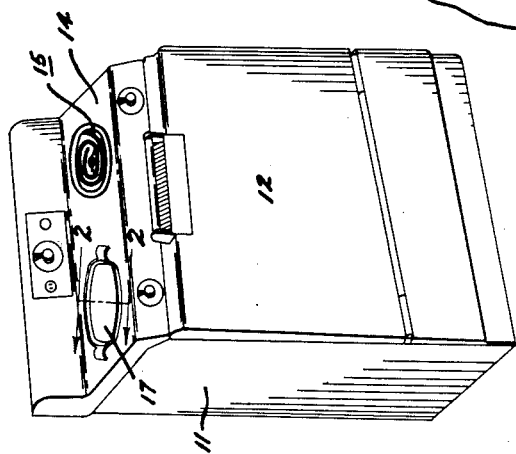
Fig. 1 is a perspective view of a range having my invention embodied therein showing a griddle located on an electric surface heater unit at the top of the range.

Referring to the drawings, I have shown in Fig. 1 thereof an electric range having outer upright metal walls 11 and a horizontally hinged door 12 normally closing an access opening leading to the interior of an oven formed within the range. A metal top 14, which may be highly polished or coated with porcelain enamel, is provided with any desirable number of openings within each of which is mounted an electric heater unit, generally represented by the reference character 15, to be hereinafter more specifically described. The walls 11, door 12, and top wall 14, are preferably secured to a skeleton frame structure (not shown) of suitable structural strength as is conventional in the art. A cooking receptacle or griddle 17 is shown removably mounted upon one of the surface heating units 15 in Fig. 1.

Referring now to Fig. 2 of the drawings, it will be noted that the range top 14 is provided with an opening 21 therein and that an electric heating unit 15 is associated with the opening 21. Unit 15 comprises a metal collar-like sleeve 22, insertable into the opening 21, having an outwardly flanged upper portion 23 overlying the opening 21 and engaging the range top wall 14 to support unit 15 therefrom. Unit 15 also comprises a metal spider or the like member 26 having a central socket or opening bounded by the wall 27 and having outwardly directed legs 28. Wall 27 of the socket or opening in member 26 of unit 15 forms an anchoring means for a purpose to be hereinafter described. The outer end of legs 28 on spider 26 rests upon knobs or portions 29 extruded from the metal wall of sleeve 22. Unit 15 further comprises a relatively flat coiled electric heating element 31 which may be mounted to the range at a point beyond the perimeter of sleeve 22 (not shown). The mounting of element 31 may be a pivotal mounting, as is conventional in the art, to permit the element to be raised and turned relative to the remainder of unit 15 for cleaning thereof and therebelow. Such heating elements are well known in the art and may be formed in any of the various ways now known and bent into the shape desired. Heating element 31 preferably comprises a helical resistance wire 32 surrounded by a seamless and bendable metal sheath or tube 33 from which it is spaced and insulated by a highly compacted mass of granular insulating material 34, preferably of good heat conductivity. The helical wire 32 is looped at the end of element 31 and has its ends secured to suitable electrical terminals at the other or pivoted end of element 31 to which terminals electric current conducting wires may be attached. Electric heating element 31 rests on and is supported by the legs 28 on spider member 26, and therefore member 26 forms a holding means for supporting element 31 within opening 21 of range top 14. Heating element 31 is provided with a flat utensil receiving and supporting portion which is elevated and held above the upper surface of range top wall 14 by member 26. A cooking receptacle or the griddle 17 is placed or positioned on the supporting portion of heating element 31 and is adapted to be heated by direct contact of its bottom therewith. The griddle 17 herein disclosed is round and may be of any desired diameter. It is to be understood, however, that the griddle 17 may be rectangular or any other desired shape.

For reasons heretofore set forth, I desire to provide means for preventing the cooking receptacle or griddle 17 from skidding or sliding laterally off the surface heater unit 15 upon which it is removably positioned when in use. In the present disclosure, the griddle is stamped and formed from heavy sheet aluminum material, and to accomplish the objects of my invention I secure a round hollow sheet aluminum stud 36 to the central portion of the bottom wall of the griddle 17. Stud 36 is provided with a flanged portion 37 which is spot welded to the griddle wall. Griddle 17 may be provided with one or more handles 38. When the griddle 17 is placed into contact with the elevated electric heating element 31 of the surface heater unit 15 on the range, stud 36, depending from the bottom of the griddle 17, extends or projects through a central open portion of heating element 31 downwardly below the utensil supporting portion thereof into the socket or opening in the center of spider member 26 and is surrounded by the wall 27. While griddle 17 is in use in combination with the range heater unit 15, it is spaced vertically from the range top wall 14 and may be readily rotated while resting on the unit or the heating element 31 thereof. Therefore, during the cooking of eggs, pancakes, sausages, hamburgers or the like, which require frequent attention and should be occasionally pressed, shifted, or turned over in the griddle, the griddle may be rotated on the heating element 31 of unit 15 to permit the housewife to work from one point in front of the range while pressing the sausages or hamburgers and upon turning the eggs or pancakes over in the griddle. Since the removable griddle 17 is located centrally upon the heater unit 15, by stud 36 fitting within the socket or opening bounded by wall 27 of spider member 26 of the heater unit, the griddle will not skid or slide off the electric heating element 31 of unit 15.

From the foregoing it should be apparent that I have made an improvement in the art and have facilitated a housewife's use of an electric range particularly in cooking items in or on a griddle placed upon a surface heating unit which is elevated relative to the range top. By removably anchoring the griddle to a heating unit in the manner disclosed, the griddle may be rotated on the heating element of the unit to insure even heating of the griddle during cooking of its contents and to prevent skidding or sliding of the griddle off the unit during its rotation. My invention reduces to a minimum the likelihood of a griddle being tilted and thereby spilling hot grease therefrom onto the range top. By rotatably anchoring a griddle as disclosed, the necessity of a housewife reaching over the griddle to the rear thereof with the likelihood of having her outstretched arms burned by hot grease, splashing or spattering from the griddle is eliminated.

While the form of embodiment of the present invention as herein disclosed constitutes a preferred form, it is to be understood that other forms might be adopted, as may come within the scope of the claims which follow.

What is claimed is as follows:

1. In combination, a heater unit including an electric heating element providing a receptacle receiving surface and including means forming walls of an anchoring socket below said surface and within the vertical plane of said heating element, a griddle having a substantially flat bottom removably positioned on said heater unit, said griddle having a projection depending from said flat bottom thereof, said projection extending into said anchoring socket and supporting the griddle upon the receiving surface of said heating element so as to be heated by contact therewith, said bottom of said griddle being spaced from all other portions of said unit while supported upon said surface, said projection on said griddle being movable within said anchoring socket to move the griddle relative to and upon the receiving surface of said heating element, and an upright wall portion of said projection abutting a wall portion of said anchoring socket and providing the sole means for preventing the griddle from sliding off said heater unit during movement of the griddle on the receiving surface of said heating element.

2. In combination, a range having a top wall provided with an opening therein, a heater unit associated with said opening in the range top wall, said unit including an electric heating element within said opening providing a receptacle receiving surface elevated above said range top wall, said unit also including means forming walls of an anchoring socket below said receptacle receiving surface of said heating element and within the vertical plane thereof, a griddle removably positioned on said heater unit, said griddle having a projection depending from the bottom thereof extending into said anchoring socket and supporting the griddle upon the receiving surface of said heating element so as to be heated by contact therewith, the bottom of said griddle being substantially flat and overlapping said range top wall in vertical spaced relation thereto while supported upon said surface, said projection on said griddle being movable within said anchoring socket to move the griddle relative to and upon the receiving surface of said heating element, and an upright wall portion of said projection abutting a wall portion of said anchoring socket and providing the sole means for preventing the griddle from sliding off said heater unit onto said range top wall during movement of the griddle on the receiving surface of said heating element.

References Cited in the file of this patent

UNITED STATES PATENTS

| Number | Name | Date |
|---|---|---|
| 1,006,104 | Kuhn et al. | Oct. 17, 1911 |
| 1,543,938 | MacInnis | June 30, 1925 |
| 1,855,507 | Bathrick | Apr. 26, 1932 |
| 1,927,686 | Kapner | Sept. 19, 1933 |
| 2,015,856 | Lang | Oct. 1, 1935 |
| 2,092,282 | Love | Sept. 7, 1937 |
| 2,430,715 | Grayson | Nov. 11, 1947 |
| 2,446,666 | Thompson | Aug. 10, 1948 |
| 2,522,085 | Beckemeyer et al. | Sept. 12, 1950 |

FOREIGN PATENTS

| Number | Country | Date |
|---|---|---|
| 760,008 | France | Dec. 6, 1933 |